No. 814,752. PATENTED MAR. 13, 1906.
D. G. WALKER.
MEAT ROASTER.
APPLICATION FILED JAN. 27, 1905.

WITNESSES:
L. Almquist
Geo. J. Hooker

INVENTOR
Daniel G. Walker
BY Munn & Co.
ATTORNEYS

UNITED STATES PATENT OFFICE.

DANIEL GREGG WALKER, OF LINDSAY, NEBRASKA.

MEAT-ROASTER.

No. 814,752.  Specification of Letters Patent.  Patented March 13, 1906.

Application filed January 27, 1905. Serial No. 242,868.

*To all whom it may concern:*

Be it known that I, DANIEL GREGG WALKER, a citizen of the United States, and a resident of Lindsay, in the county of Platte and State of Nebraska, have invented a new and Improved Meat-Roaster, of which the following is a full, clear, and exact description.

The invention relates to culinary vessels; and its object is to provide a new and improved meat-roaster arranged to insure automatic and proper basting of the meat without loss of the meat-juices and the basting fluid used.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1:
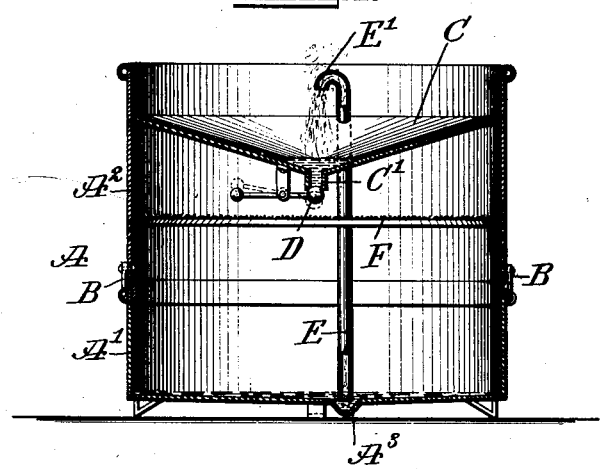
Figure 2:
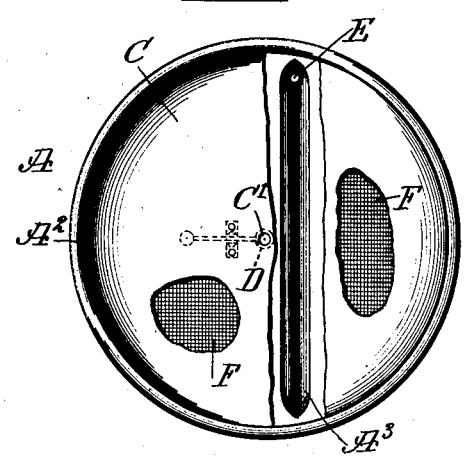

Figure 1 is a sectional side elevation of the improvement, and Fig. 2 is a plan view of the same, parts being broken out.

The pan A shown in the drawings may be of any desired shape, but is preferably made in two parts A' and A², adapted to be fastened together by suitable fastening devices B, such as hooks and staples, the lower part A' being adapted to receive and support the meat to be roasted. In the upper part A² is arranged a hopper-shaped partition C, adapted to form a reservoir for the basting fluid, and the spout C' of this reservoir is adapted to be closed on the under side by a suitable ball or other valve D.

In the pan A extends vertically a tube E, reaching with its lower end into a well A³, formed in the bottom of the lower part A' of the pan, and the said tube E extends through the partition C and its upper end E' is curved downward to discharge into the reservoir for the basting fluid.

In the lower portion of the upper part A² of the pan A is arranged a transversely-extending distributer in the form of a screen F, upon which passes the basting fluid from the spout C' at the time the valve D opens, and this screen F distributes the basting fluid over the meat contained in the roasting chamber formed in the lower portion of the pan.

The operation is as follows: When the part A² is separated from the part A', then the meat to be roasted can be readily placed in the part A', and then the top part A² is set upon the upper end of the part A' and fastened thereto by the fastening devices B. The basting-fluid to be used is now placed in the reservoir formed on the top of the partition C, and a portion of this basting fluid is allowed to flow into the roasting-chamber by supplying sufficient basting fluid to the reservoir to cause the ball-valve D to open. The pan is now placed in position on the stove, and the heat from the stove causes a portion of the basting fluid in the part A' to evaporate, the vapors pressing on the basting fluid, so as to force the same up through the tube E and its vent E' into the reservoir on top of the partition C. When nearly all of the fluid has been forced to the reservoir C, the steam will escape through the tube E, which relieves the pressure on the under side of the ball-valve D, when the weight of the fluid in the reservoir will displace the valve D, and the fluid will flow again onto the distributer F and from the latter onto the meat undergoing roasting in the roasting-chamber. This circuit of the fluids will be made every few minutes as long as a roasting temperature is maintained in the roaster. The higher the temperature the faster will the steam be formed and the oftener will the automatic basting take place.

The meat-roaster described is very simple and durable in construction and insures an automatic basting of the meat without loss of the meat-juices or the basting fluid used.

Having thus described my invention, I claim as new and desire to secure by Letters Patent—

1. A meat-roaster comprising a pan having a roasting-chamber for the meat, a hopper-shaped partition forming a reservoir over the roasting-chamber and in communication therewith, and a pipe extending from near the bottom of the chamber and through said partition, to discharge basting fluid into the reservoir.

2. A meat-roaster comprising a pan having a roasting-chamber for the meat, a hopper-shaped partition forming a reservoir over the roasting-chamber and in communication therewith, a pipe extending from near the bottom of the chamber through the partition, to discharge basting fluid into the reservoir, and a distributer beneath said platform in the upper portion of the chamber, upon which passes the basting fluid from the reservoir.

3. A meat-roaster comprising a pan having a roasting-chamber for the meat, a reservoir over the roasting-chamber and in communication therewith, a pipe extending from near the bottom of the chamber through the top thereof, to discharge basting fluid into the reservoir, and a valve controlling the flow of the basting fluid from the reservoir into the roasting-chamber, and preventing escape of steam from the roasting-chamber.

4. A meat-roaster comprising a pan having a hopper-shaped partition in its upper portion, to provide a roasting-chamber below the portion and the partition forming a reservoir above the roasting-chamber, a valve controlling the discharge-spout of the partition, a pipe leading from near the bottom of the roasting-chamber and discharging into the said reservoir, and a screen in the roasting-chamber, below the said spout.

In testimony whereof I have signed my name to this specification in the presence of two subscribing witnesses.

DANIEL GREGG WALKER.

Witnesses:
CHAS. E. CHARNQUIST,
MARTIN MOGAN.